United States Patent
Agarwal et al.

(10) Patent No.: US 12,015,921 B2
(45) Date of Patent: Jun. 18, 2024

(54) METHOD AND APPARATUS FOR AVOIDING DENIAL OF SERVICES IN MOBILE COMMUNICATIONS

(71) Applicant: MediaTek Singapore Pte. Ltd., Singapore (SG)

(72) Inventors: Vidha Agarwal, Bangalore (IN); Matti Moisanen, Oulu (FI); Marko Niemi, Oulu (FI)

(73) Assignee: MediaTek Singapore Pte. Ltd., Singapore (SG)

(*) Notice: Subject to any disclaimer, the term of this patent is extended or adjusted under 35 U.S.C. 154(b) by 91 days.

(21) Appl. No.: 15/808,754

(22) Filed: Nov. 9, 2017

(65) Prior Publication Data

US 2018/0070238 A1 Mar. 8, 2018

Related U.S. Application Data

(60) Provisional application No. 62/419,990, filed on Nov. 10, 2016.

(51) Int. Cl.
*H04L 9/00* (2022.01)
*H04L 9/40* (2022.01)
(Continued)

(52) U.S. Cl.
CPC ......... *H04W 12/10* (2013.01); *H04L 63/1458* (2013.01); *H04W 12/12* (2013.01);
(Continued)

(58) Field of Classification Search
CPC ..... H04W 12/10; H04W 12/12; H04W 64/00; H04W 48/16; H04W 12/63; H04W 12/122; H04L 63/1458; H04L 2463/141
See application file for complete search history.

(56) References Cited

U.S. PATENT DOCUMENTS

| 9,326,227 B2 | 4/2016 | Gunaratnam et al. |
| 2006/0084443 A1 | 4/2006 | Yeo et al. |

(Continued)

FOREIGN PATENT DOCUMENTS

| CN | 105722158 A | 6/2016 |
| EP | 1814270 B1 | 8/2007 |

(Continued)

OTHER PUBLICATIONS

Taiwan Intellectual Property Office, Office Action for Taiwan Patent Application No. 106138948, dated Oct. 1, 2019.
(Continued)

*Primary Examiner* — Daniel B Potratz
*Assistant Examiner* — Syed M Ahsan
(74) *Attorney, Agent, or Firm* — Han IP PLLC; Andy M. Han

(57) ABSTRACT

Various solutions for avoiding denial of services with respect to mobile station (MS) and network apparatus in mobile communications are described. A MS may receive a first reject message from a network apparatus in a location area. The first reject message may comprise a first reject cause. The MS may also receive a second reject message from the network apparatus in the location area. The second reject message may comprise a second reject cause. The MS may store an identification of the location area in a forbidden location area list in an event that both the first reject cause and the second reject cause are received from the same location area. The MS may further search for another location area or tracking area.

14 Claims, 7 Drawing Sheets

(51) Int. Cl.
*H04W 12/10* (2021.01)
*H04W 12/12* (2021.01)
*H04W 48/16* (2009.01)
*H04W 64/00* (2009.01)
*H04W 12/63* (2021.01)

(52) U.S. Cl.
CPC ........... *H04W 48/16* (2013.01); *H04W 64/00* (2013.01); *H04L 2463/141* (2013.01); *H04W 12/63* (2021.01)

(56) References Cited

U.S. PATENT DOCUMENTS

| | | | | |
|---|---|---|---|---|
| 2008/0084272 | A1* | 4/2008 | Modiano | G07B 15/063 340/5.2 |
| 2011/0028120 | A1* | 2/2011 | Wu | H04W 36/0022 455/404.1 |
| 2011/0216698 | A1* | 9/2011 | Tiwari | H04W 48/02 370/328 |
| 2012/0155257 | A1* | 6/2012 | Tiwari | H04W 60/005 370/230 |
| 2013/0083775 | A1 | 4/2013 | Sun et al. | |
| 2013/0316699 | A1 | 11/2013 | Jheng et al. | |
| 2014/0286282 | A1* | 9/2014 | Jamadagni | H04W 36/0022 370/329 |
| 2015/0245258 | A1 | 8/2015 | Kim et al. | |
| 2015/0304897 | A1 | 10/2015 | Olsson et al. | |
| 2016/0112916 | A1 | 4/2016 | Kim et al. | |
| 2016/0255674 | A1 | 9/2016 | Niemi et al. | |
| 2018/0007621 | A1* | 1/2018 | Kim | H04W 76/23 |
| 2019/0045423 | A1* | 2/2019 | Kumar | H04W 68/005 |

FOREIGN PATENT DOCUMENTS

| | | | | |
|---|---|---|---|---|
| EP | 2871874 A1 | * | 5/2015 | ............. H04W 8/04 |
| EP | 2871874 B1 | * | 3/2018 | ............. H04W 8/04 |
| IN | 201641003718 | * | 2/2016 | |
| WO | WO 2016126092 A1 | | 8/2016 | |

OTHER PUBLICATIONS

European Patent Office, European Search Report for EP Application No. 17869752.0, dated Oct. 29, 2019.

China National Intellectual Property Administration, First Office Action for China Patent Application No. 201780003890.3, dated Jun. 28, 2020.

China National Intellectual Property Administration, Search Report of First Office Action for China Patent Application No. 201780003890.3, dated Jun. 28, 2020.

China National Intellectual Property Administration, First Office Action for China Patent Application No. 201780003890.3, dated Jul. 25, 2022.

* cited by examiner

METHOD AND APPARATUS FOR AVOIDING DENIAL OF SERVICES IN MOBILE COMMUNICATIONS

CROSS REFERENCE TO RELATED PATENT APPLICATION

The present disclosure claims the priority benefit of U.S. Provisional Patent Application No. 62/419,990, filed on 10 Nov. 2016, the content of which is incorporated by reference in its entirety.

TECHNICAL FIELD

The present disclosure is generally related to mobile communications and, more particularly, to avoiding denial of services with respect to mobile station in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals.

In $3^{rd}$ Generation Partnership Project (3GPP) regulations, certain protocol messages are allowed to be transmitted without integrity protection. This may allow some rogue networks or false networks to attack a mobile station (MS) by using those non-integrity protected protocol messages. The integrity protection is a security protection mechanism between the MS and the network. Without the integrity protection, the communications between the MS and the network may be unsafe. Before the integrity protection is enabled, those rogue networks or false networks may use the non-integrity protected protocol messages to attack the MS. The rogue networks or false networks may try to invalidate subscriber identity module (SIM) or UMTS subscriber identity module (USIM) of the MS and may cause denial of services for the MS. The MS may have no protective mechanism to block out those rogue networks or false networks. The MS may suffer malicious attack and may even lose services from normal networks.

Accordingly, it is important to properly block out those malicious networks. Therefore, in developing communication system, it is needed to provide proper mechanisms for preventing attack from those malicious networks and avoiding denial of services caused by those rogue networks or false networks.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to avoiding denial of services with respect to mobile station and network apparatus in mobile communications.

In one aspect, a method may involve an apparatus receiving a first reject message from a network apparatus in a location area. The method may also involve the apparatus receiving a second reject message from the network apparatus in the location area. The method may further involve the apparatus storing an identification of the location area in a forbidden location area list and searching for another location area or tracking area.

In another aspect, a method may involve an apparatus receiving a reject message from a network apparatus in a location area. The method may also involve the apparatus determining that the network apparatus supports solely single domain services. The method may further involve the apparatus storing an identification of the location area in a forbidden location area list and searching for another location area or tracking area.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to avoiding denial of services with respect to user equipment in mobile communications. According to the present disclosure, a number of possible solutions may be implemented separately or jointly. That is, although these possible solutions may be described below separately, two or more of these possible solutions may be implemented in one combination or another.

In 3$^{rd}$ Generation Partnership Project (3GPP) regulations, certain protocol messages are allowed to be transmitted without integrity protection. This may allow some rogue networks or false networks to attack a mobile station (MS) by using those non-integrity protected protocol messages. The integrity protection is a security protection mechanism between the MS and the network. Without the integrity protection, the communications between the MS and the network may be unsafe. Before the integrity protection is enabled, those rogue networks or false networks may use the non-integrity protected protocol messages to attack the MS. The MS may have no protective mechanism to block out those rogue networks or false networks. The MS may suffer malicious attack and may even lose services from normal networks.

Figure 1:
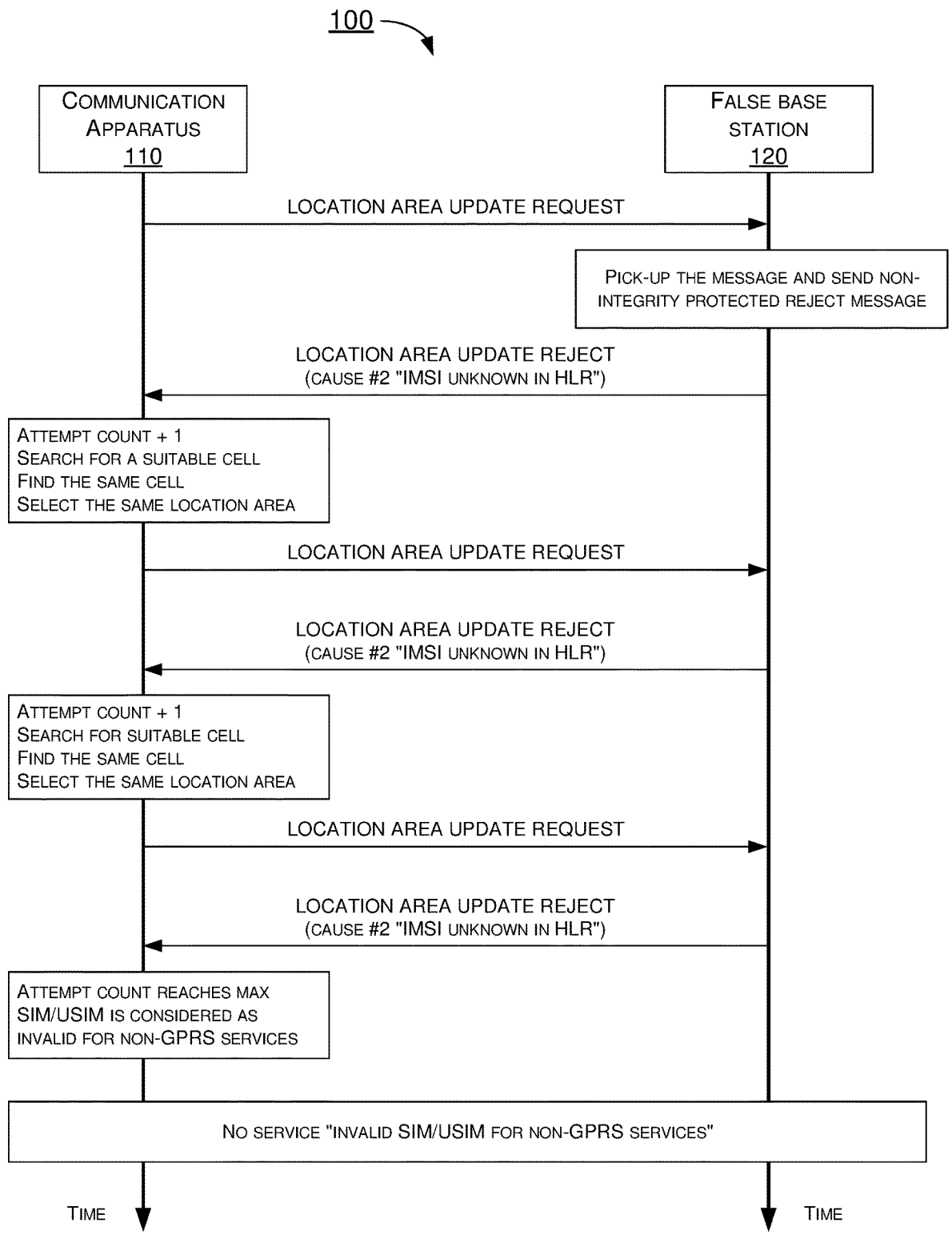
FIG. 1 is a diagram depicting an example scenario under schemes in accordance with a communication system.

FIG. 1 illustrates an example scenario 100 under schemes in accordance with implementations of a communication system. Scenario 100 involves a communication apparatus (e.g., a mobile station (MS) or a user equipment (UE)) and a network apparatus, which may be a part of a wireless network (e.g., a General Packet Radio Service (GPRS) network, a Universal Mobile Telecommunications System (UMTS) network or a Long-Term Evolution (LTE) network). In this example, the network apparatus may be a false base station or a rogue base station. The false base station or the rogue base station is not deployed for providing normal services and may be configured to send fake messages to attack the communication apparatus. The communication apparatus may be not able to identify that the network apparatus is a false base station or a rogue base station and may try to communicate with or send messages to the false base station or the rogue base station.

As showed in FIG. 1, communication apparatus 110 may be configured to send a request message (e.g., location area update request) to false base station 120. False base station 120 may be configured to pick-up the request message and send a non-integrity protected reject message (e.g., location area update reject) to communication apparatus 110. The reject message may comprise a reject cause (e.g., cause #2) to indicate that international mobile subscriber identity (IMSI) is unknown in a home location register (HLR). Communication apparatus 110 may be configured to maintain an attempt count for counting how many times the request message were transmitted. After receiving the reject message, communication apparatus 110 may increase the attempt count by 1. Then, communication apparatus 110 may be configured to search for a suitable cell for sending a next request message. Since false base station 120 is not in a forbidden list, communication apparatus 110 may have very high possibility to find the same cell (e.g., false base station 120) again and may select the same location area. Communication apparatus 110 may be configured to send a further request message (e.g., location area update request) to false base station 120 again. Similarly, false base station 120 may be configured to pick-up the request message and send a non-integrity protected reject message (e.g., location area update reject) to communication apparatus 110 again. After receiving the reject message, communication apparatus 110 may further increase the attempt count by 1 and try to search for a suitable cell for sending a next request message. The same procedures may be repeatedly performed until the attempt count reaches a maximum value. When the attempt count reaches the maximum value, the subscriber identity module (SIM) or the UMTS subscriber identity module (USIM) of communication apparatus 110 will be considered as invalid for non-GPRS services. Communication apparatus 110 may enter into a no service state due to invalid SIM/USIM for non-GPRS services and may not get any services for a certain time. Furthermore, communication apparatus 110 may further attempt to initiate routing area update procedures to the same false base station until the SIM/USIM is considered as invalid for GPRS services also.

In view of the above procedures, after receiving the non-integrity protected reject messages with specific reject causes, communication apparatus 110 is not required to set the location area of the cell in a list of forbidden location area. This means that communication apparatus 110 may select the same cell again either in next cell selection or in cell re-selection if communication apparatus 110 has not moved out of the coverage of the false cell. The false cell may use this way to attack the communication apparatus and block the communication apparatus from getting normal services.

Figure 2:
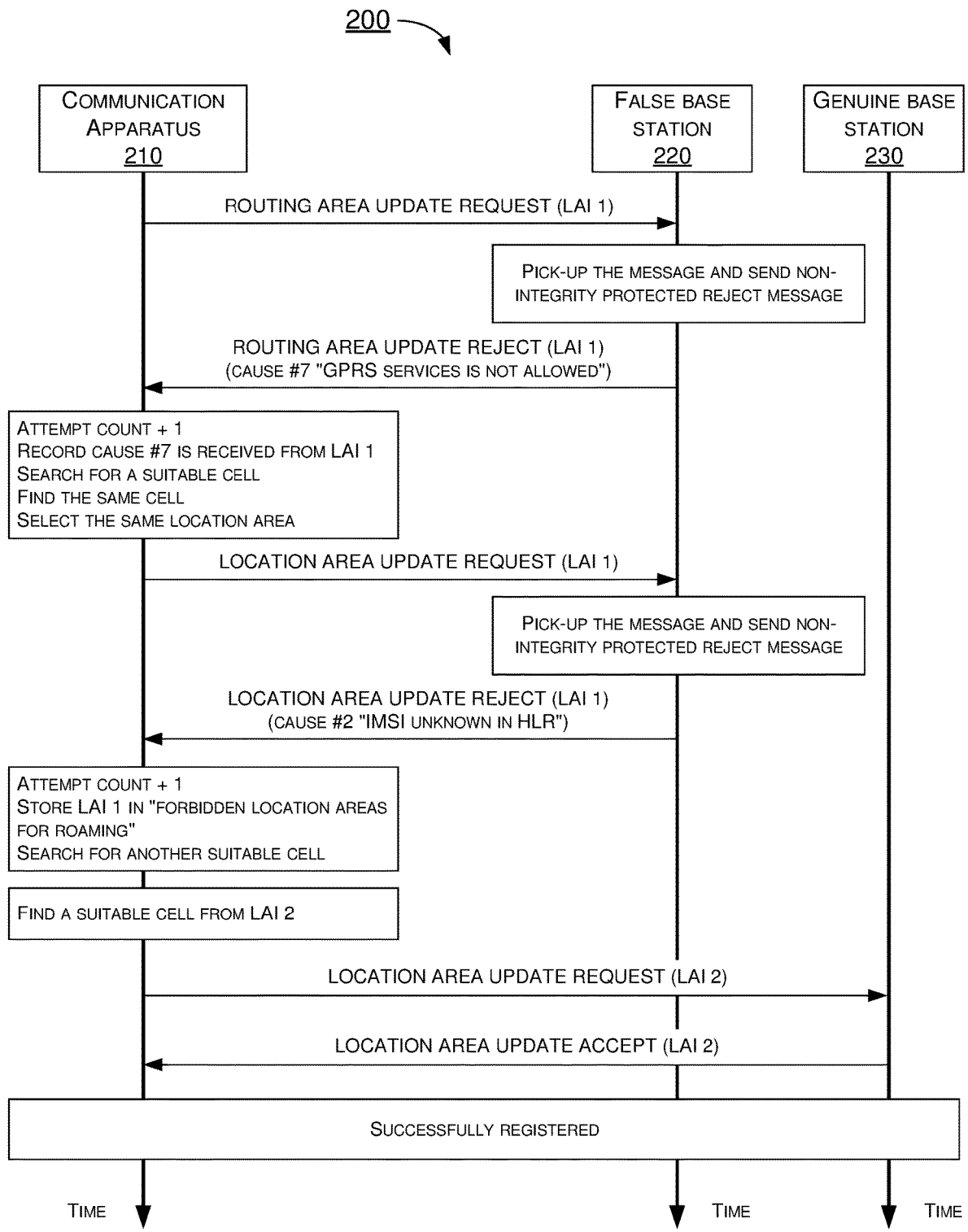
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a communication apparatus (e.g., a mobile station (MS) or a user equipment (UE)) and a network apparatus, which may be a part of a wireless network (e.g., a General Packet Radio Service (GPRS) network, a Universal Mobile Telecommunications System (UMTS) network or a Long-Term Evolution (LTE) network). In this example, there may be a false base station (i.e., a rogue base station) and a genuine base station. The false base station may be deployed near the communication apparatus. The false base station is not deployed for providing normal services and may be configured to send fake messages to attack the communication apparatus. The communication apparatus may be not able to identify whether the network apparatus is a false base station or a genuine base station and may try to communicate with or send messages to the false base station.

As showed in FIG. 2, communication apparatus 210 may be configured to send a first request message (e.g., routing area update request) to false base station 220 in a first location area (e.g., location area identity (LAI) 1). False base station 220 may be configured to pick-up the first request message and send a first non-integrity protected reject message (e.g., routing area update reject) to communication apparatus 210. The first reject message may comprise a first reject cause (e.g., cause #7) to indicate that GPRS services is not allowed. Communication apparatus 210 may be configured to maintain an attempt count for counting how many times the request message were transmitted. After receiving the first reject message, communication apparatus 210 may increase the attempt count by 1. Communication apparatus 210 may further be configured to record that the first reject cause (e.g., cause #7) is received from the first location area (e.g., LAI 1). Then, communication apparatus 210 may be configured to search for a suitable cell for sending a next request message. Since false base station 220 is not in a forbidden list yet, communication apparatus 210 may have very high possibility to find the same cell (e.g., false base station 220) again and may select the same location area. Communication apparatus 210 may be configured to send a second request message (e.g., location area update request) to false base station 220 in the first location area (e.g., LAI 1). False base station 220 may be configured to pick-up the second request message and send a second non-integrity protected reject message (e.g., location area update reject) to communication apparatus 210. The second reject message may comprise a second reject cause (e.g., cause #2) to indicate that IMSI is unknown in HLR.

After receiving the reject message, communication apparatus 210 may further increase the attempt count by 1. Since communication apparatus 210 recorded that the first reject cause (e.g., cause #7) is received, communication apparatus 210 may be able to determine that both the first reject cause (e.g., cause #7) and the second reject cause (e.g., cause #2) are received from the same location area (e.g., LAI 1). Communication apparatus 210 may be configured to store an identification of the first location area (e.g., LAI 1) in a forbidden location area list (e.g., a list of "forbidden location areas for roaming"). Then, communication apparatus 210 may be configured to perform cell selection or re-selection to search for a suitable cell for registration. Communication apparatus 210 may be configured to ignore network apparatus in the first location area (e.g., LAI 1) and searching for another location area or tracking area. Communication apparatus 210 may be configured to send a third request message (e.g., location area update request) to genuine base station 230 in a second location area (e.g., LAI 2). Since genuine base station 230 is a normal base station, genuine base station 230 may be configured to send an accept message (e.g., location area update accept) to communication apparatus 210. After receiving the accept message, communication apparatus 210 may be able to successfully register on genuine base station 230 and get normal services from the genuine network.

In some implementations, the above mechanism may be applied to a Network Operation Mode II (NMO-II) network. The NMO-II network may support both circuit switch (CS) domain services and packet switch (PS) domain services. In the NMO-II network, the GPRS mobility management (GMM) attach procedure for PS domain registration and the IMSI attach procedure for CS domain registration have to be performed separately. Therefore, the communication apparatus has to send two separate request messages for PS domain registration and CS domain registration respectively and may receive reject messages with different reject causes correspondingly. In order to prevent the communication apparatus from keep being rejected form a false base station, the communication apparatus should remember in an event that it receives cause #2 in a non-integrity protected location area update reject message and in an event that it receives also cause #7 in a non-integrity protected routing area update reject message at the same location area. In an event that the communication apparatus receives both cause #2 and cause #7 from the same location area, the communication apparatus should store an identification of the location area in a forbidden location area list and perform cell selection or re-selection to find a suitable cell in another location area or tracking area.

In some implementations, the communication apparatus may send a location area update request first and receive a reject message with cause #2 first, and send a routing area update request and receive a reject message with cause #7 later. The communication apparatus may also be configured to record that cause #2 is received from the location area first. When cause #7 is also received from the same location area, the communication apparatus may be configured to store an identification of the location area in a forbidden location area list and perform cell selection or re-selection to find a suitable cell in another location area or tracking area.

In some implementations, the request message may be a location area update request message, a routing area update request message, an attach request message or other request messages. The reject message may be a location area update reject message, a routing area update reject message, an attach reject message or other reject messages. The reject cause for rejecting CS domain registration may be cause #2 or any other reject causes indicating that CS domain services is not available. The reject cause for rejecting PS domain registration may be cause #7 or any other reject causes indicating that PS domain services is not available.

In some implementations, the above mechanism may be applied to a Network Operation Mode I (NMO-I) network. The NMO-I network may support both circuit switch (CS) domain services and packet switch (PS) domain services. In the NMO-I network, a combined attach including the GMM attach and the IMSI attach can be performed. However, the communication apparatus in the NMO-I network may act as in the NMO-II network. For example, the communication apparatus may send a combined attach message or a routing area update request message for both CS domain and PS domain registration and receive a non-integrity protected reject message with cause #7 in PS domain solely. Then, the communication apparatus may behave as in the NMO-II network to further send an attach message or a location area update message for CS domain registration and receive a non-integrity protected reject message with cause #2 in CS domain. In such scenario, the communication apparatus should also store an identification of the location area in a forbidden location area list and perform cell selection or re-selection to find a suitable cell in another location area or tracking area.

In some implementations, the communication apparatus may be configured to maintain a flag for recording whether a reject cause in PS domain or a reject cause in CS domain is received. The communication apparatus may be configured to set the flag for the first rejected domain. When the second domain also gets rejected and the flag is already set, the communication apparatus may be configured to store an identification of the current LAI in a forbidden location area list. The communication apparatus may further perform cell selection or re-selection to find another cell. The communication apparatus may be configured to search all available radio access technology or (RAT).

Figure 3:
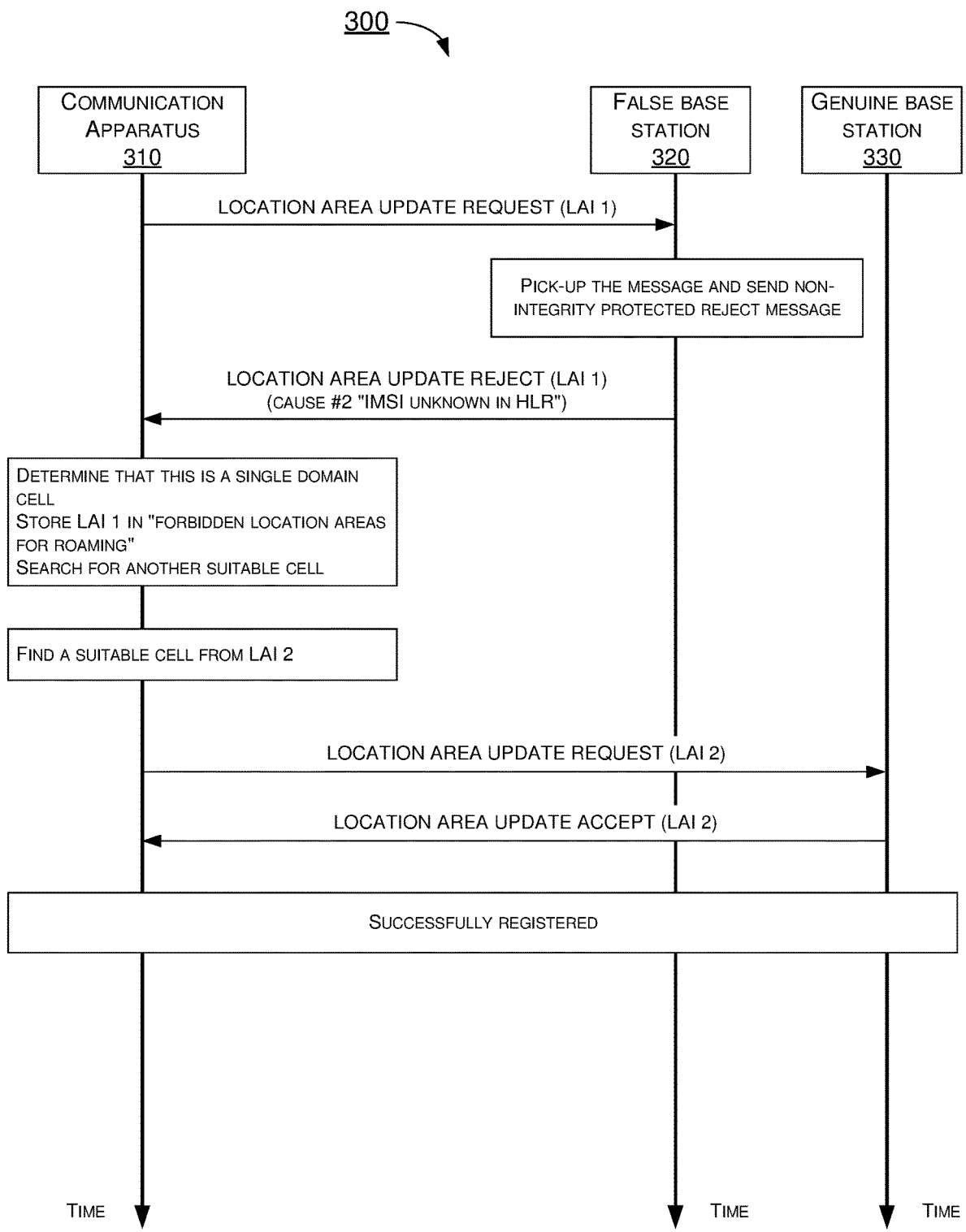
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a communication apparatus (e.g., a mobile station (MS) or a user equipment (UE)) and a network apparatus, which may be a part of a wireless network (e.g., a General Packet Radio Service (GPRS) network, a Universal Mobile Telecommunications System (UMTS) network or a Long-Term Evolution (LTE) network). In this example, there may be a false base station (i.e., a rogue base station) and a genuine base station. The false base station may be deployed near the communication apparatus. The false base station is not deployed for providing normal services and may be configured to send fake messages to attack the communication apparatus. The communication apparatus may be not able to identify whether the network apparatus is a false base station or a genuine base station and may try to communicate with or send messages to the false base station. The false base station may be a single domain cell. In other words, the false base station may offer services solely for single domain (e.g., either CS domain or PS domain).

As showed in FIG. 3, communication apparatus 310 may be configured to send a request message (e.g., location area update request) to false base station 320 in a first location area (e.g., location area identity (LAI) 1). False base station 320 may be configured to pick-up the first request message and send a non-integrity protected reject message (e.g., location area update reject) to communication apparatus 310. The reject message may comprise a reject cause (e.g., cause #2) to indicate that IMSI is unknown in HLR. Communication apparatus 310 may be configured to determine whether false base station 320 is a single domain cell. This may be determined according to the system information broadcasted by false base station 320. Communication apparatus 310 may be configured to receive system information transmitted from false base station 320 and determine whether false base station 320 supports solely single domain services. After determining that false base station 320 is a single domain cell and receiving the reject message with cause #2, communication apparatus 310 may be configured to store an identification of the first location area (e.g., LAI 1) in a forbidden location area list (e.g., a list of "forbidden location areas for roaming"). Then, communication apparatus 310 may be configured to perform cell selection or re-selection to search for a suitable cell for registration. Communication apparatus 310 may be configured to ignore network apparatus in the first location area (e.g., LAI 1) and searching for another location area or tracking area. Communication apparatus 310 may be configured to send a request message (e.g., location area update request) to genuine base station 330 in a second location area (e.g., LAI 2). Since genuine base station 330 is a normal base station, genuine base station 330 may be configured to send an accept message (e.g., location area update accept) to communication apparatus 310. After receiving the accept message, communication apparatus 310 may be able to successfully register on genuine base station 330 and get normal services from the genuine network.

Figure 4:
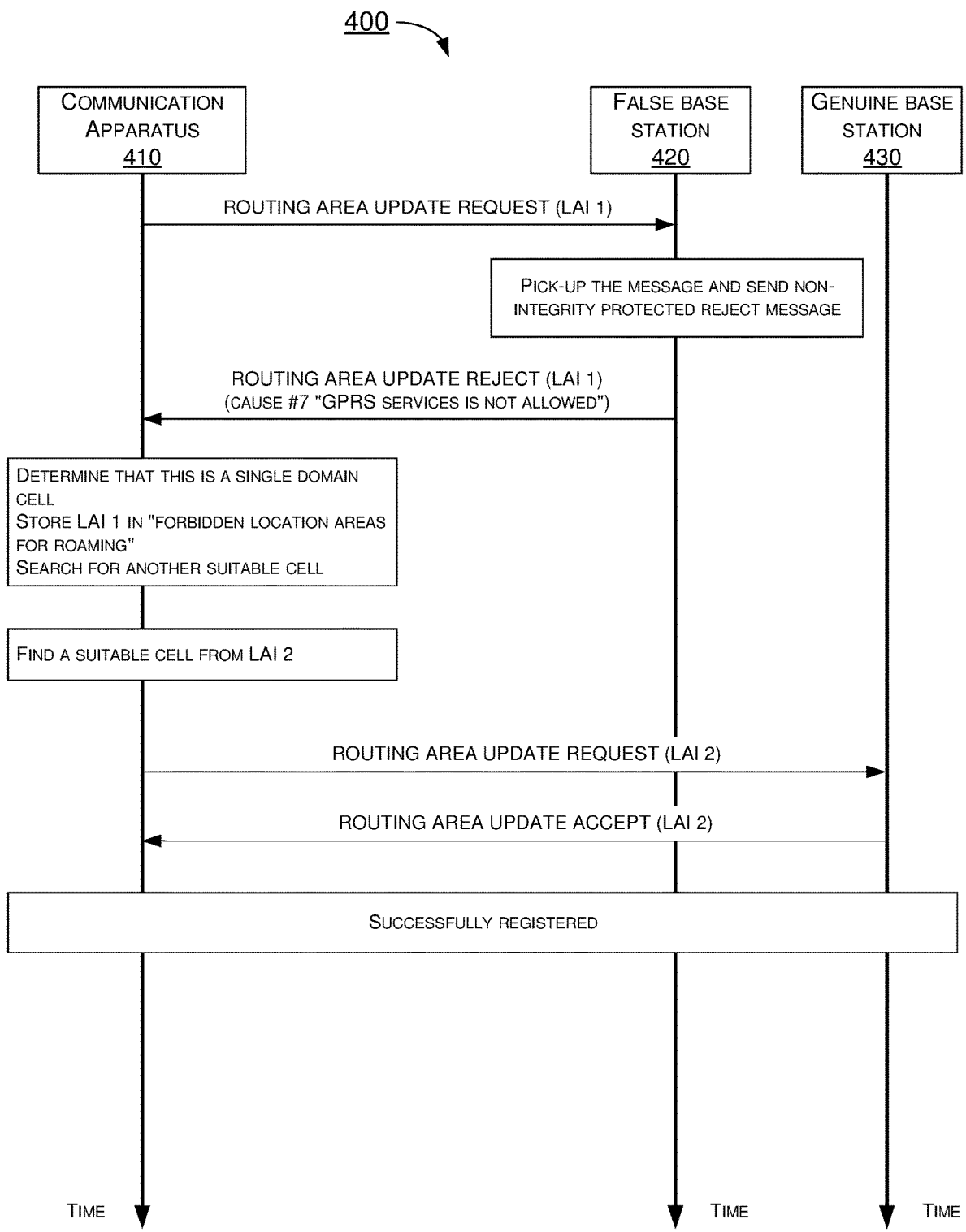
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a communication apparatus (e.g., a mobile station (MS) or a user equipment (UE)) and a network apparatus, which may be a part of a wireless network (e.g., a General Packet Radio Service (GPRS) network, a Universal Mobile Telecommunications System (UMTS) network or a Long-Term Evolution (LTE) network). In this example, there may be a false base station (i.e., a rogue base station) and a genuine base station. The false base station may be deployed near the communication apparatus. The false base station is not deployed for providing normal services and may be configured to send fake messages to attack the communication apparatus. The communication apparatus may be not able to identify whether the network apparatus is a false base station or a genuine base station and may try to communicate with or send messages to the false base station. The false base station may be a single domain cell. In other words, the false base station may offer services solely for single domain (e.g., either CS domain or PS domain).

As showed in FIG. 4, communication apparatus 410 may be configured to send a request message (e.g., routing area update request) to false base station 420 in a first location area (e.g., location area identity (LAI) 1). False base station 420 may be configured to pick-up the first request message and send a non-integrity protected reject message (e.g., routing area update reject) to communication apparatus 410. The reject message may comprise a reject cause (e.g., cause #7) to indicate that GPRS services is not allowed. Communication apparatus 410 may be configured to determine whether false base station 420 is a single domain cell. This may be determined according to the system information broadcasted by false base station 420. Communication apparatus 410 may be configured to receive system information transmitted from false base station 420 and determine whether false base station 420 supports solely single domain services. After determining that false base station 420 is a single domain cell and receiving the reject message with cause #7, communication apparatus 410 may be configured to store an identification of the first location area (e.g., LAI 1) in a forbidden location area list (e.g., a list of "forbidden location areas for roaming"). Then, communication apparatus 410 may be configured to perform cell selection or re-selection to search for a suitable cell for registration. Communication apparatus 410 may be configured to ignore network apparatus in the first location area (e.g., LAI 1) and searching for another location area or tracking area. Communication apparatus 410 may be configured to send a request message (e.g., routing area update request) to genuine base station 430 in a second location area (e.g., LAI 2). Since genuine base station 430 is a normal base station, genuine base station 430 may be configured to send an accept message (e.g., routing area update accept) to communication apparatus 410. After receiving the accept message, communication apparatus 410 may be able to successfully register on genuine base station 430 and get normal services from the genuine network.

Illustrative Implementations

Figure 5:
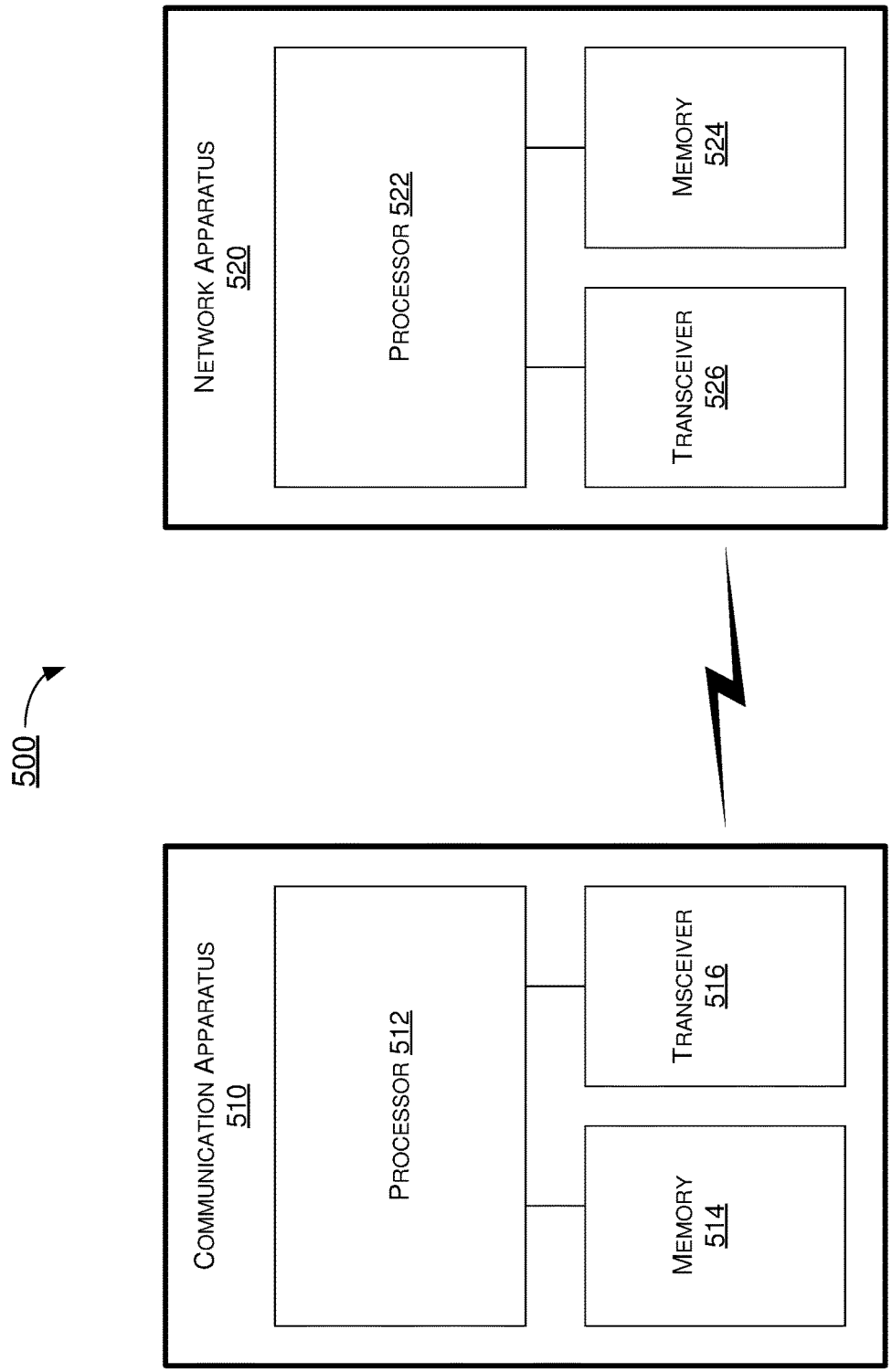
FIG. 5 is a block diagram of an example communication apparatus and an example network apparatus in accordance with an implementation of the present disclosure.

FIG. 5 illustrates an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to avoiding denial of services with respect to user equipment and network apparatus in wireless communications, including scenarios 200, 300 and 400 described above as well as processes 600 and 700 described below.

Communication apparatus 510 may be a part of an electronic apparatus, which may be a mobile station (MS) or a user equipment (UE) such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT apparatus such as an immobile or a stationary apparatus, a home apparatus, a wire communication apparatus or a computing apparatus. For instance, communication apparatus 510 may be implemented in a smart thermostat, a smart fridge, a smart doorlock, a wireless speaker or a home control center. Alternatively, communication apparatus 510 may be implemented in the form of one or more integrated-circuit (IC) chips such as, for example and without limitation, one or more single-core processors, one or more multi-core processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in a base station in a GPRS network or a UMTS network or in an eNodeB in a LTE network. Alternatively, network apparatus 520 may be implemented in the form of one or more IC chips such as, for example and without limitation, one or more single-core processors, one or more multi-core processors, or one or more CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including power consumption reduction in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may be configured to send, via transceiver 516, a first request message (e.g., routing area update request) to network apparatus 520 in a first location area (e.g., location area identity (LAI) 1). Processor 512 may be configured to receive, via transceiver 516, a first non-integrity protected reject message (e.g., routing area update reject) from network apparatus 520. The first reject message may comprise a first reject cause (e.g., cause #7) to indicate that GPRS services is not allowed. Processor 512 may be configured to maintain an attempt count, in memory 514, for counting how many times the request message were transmitted. After receiving the first reject message, processor 512 may increase the attempt count by 1. Processor 512 may further be configured to record, in memory 514, that the first reject cause (e.g., cause #7) is received from the first location area (e.g., LAI 1). Then, processor 512 may be configured to search for a suitable cell for sending a next request message.

In some implementations, processor 512 may have very high possibility to find the same cell again and may select the same location area. Processor 512 may be configured to send, via transceiver 516, a second request message (e.g., location area update request) to network apparatus 520 in the first location area (e.g., LAI 1). Processor 512 may be configured to receive, via transceiver 516, a second non-integrity protected reject message (e.g., location area update reject) from network apparatus 520. The second reject message may comprise a second reject cause (e.g., cause #2) to indicate that IMSI is unknown in HLR. After receiving the reject message, processor 512 may further increase the attempt count by 1.

In some implementations, since processor 512 recorded that the first reject cause (e.g., cause #7) is received, processor 512 may be able to determine that both the first reject cause (e.g., cause #7) and the second reject cause (e.g., cause #2) are received from the same location area (e.g., LAI 1). Processor 512 may be configured to store an identification of the first location area (e.g., LAI 1) in a forbidden location area list (e.g., a list of "forbidden location areas for roaming"). Then, processor 512 may be configured to perform cell selection or re-selection to search for a suitable cell for registration. Processor 512 may be configured to ignore network apparatus in the first location area (e.g., LAI 1) and searching for another location area or tracking area.

In some implementations, processor 512 may be configured to send, via transceiver 516, a third request message (e.g., location area update request) to a genuine base station in a second location area (e.g., LAI 2). Processor 512 may be configured to receive, via transceiver 516, an accept message (e.g., location area update accept) from the genuine base station. After receiving the accept message, communication apparatus 510 may be able to successfully register on the genuine base station and get normal services from the genuine network.

In some implementations, processor 512 may send two separate request messages for PS domain registration and CS domain registration respectively and may receive reject messages with different reject causes correspondingly. In order to prevent communication apparatus 510 from keep being rejected form a false base station, processor 512 should remember in an event that it receives cause #2 in a non-integrity protected location area update reject message and in an event that it receives also cause #7 in a non-integrity protected routing area update reject message at the same location area. In an event that processor 512 receives both cause #2 and cause #7 from the same location area, processor 512 should store an identification of the location area in a forbidden location area list and perform cell selection or re-selection to find a suitable cell in another location area or tracking area.

In some implementations, processor 512 may send a location area update request first and receive a reject message with cause #2 first, and send a routing area update request and receive a reject message with cause #7 later. Processor 512 may also be configured to record that cause #2 is received from the location area first. When cause #7 is also received from the same location area, processor 512 may be configured to store an identification of the location area in a forbidden location area list and perform cell selection or re-selection to find a suitable cell in another location area or tracking area.

In some implementations, processor 512 may send a combined attach message or a routing area update request message for both CS domain and PS domain registration and receive a non-integrity protected reject message with cause #7 in PS domain solely. Then, processor 512 may behave as in the NMO-II network to further send an attach message or a location area update message for CS domain registration and receive a non-integrity protected reject message with cause #2 in CS domain. In such scenario, processor 512 should also store an identification of the location area in a forbidden location area list and perform cell selection or re-selection to find a suitable cell in another location area or tracking area.

In some implementations, processor 512 may be configured to maintain a flag, in memory 514, for recording whether a reject cause in PS domain or a reject cause in CS domain is received. Processor 512 may be configured to set the flag for the first rejected domain. When the second domain also gets rejected and the flag is already set, processor 512 may be configured to store an identification of the current LAI in a forbidden location area list. Processor 512 may further perform cell selection or re-selection to find another cell. Processor 512 may be configured to search all available radio access technology or (RAT).

In some implementations, processor 512 may be configured to send, via transceiver 516, a request message (e.g., location area update request) to network apparatus 520 in a first location area (e.g., location area identity (LAI) 1). Processor 512 may be configured to receiver, via transceiver 516, a non-integrity protected reject message (e.g., location area update reject) from network apparatus 520. The reject message may comprise a reject cause (e.g., cause #2) to indicate that IMSI is unknown in HLR. Processor 512 may be configured to determine whether network apparatus 520 is a single domain cell. This may be determined according to the system information broadcasted by network apparatus 520. Processor 512 may be configured to receive system information transmitted from network apparatus 520 and determine whether network apparatus 520 supports solely single domain services. After determining that network apparatus 520 is a single domain cell and receiving the reject message with cause #2, processor 512 may be configured to store an identification of the first location area (e.g., LAI 1) in a forbidden location area list (e.g., a list of "forbidden location areas for roaming"). Then, processor 512 may be configured to perform cell selection or re-selection to search for a suitable cell for registration. Processor 512 may be configured to ignore network apparatus in the first location area (e.g., LAI 1) and searching for another location area or tracking area. Processor 512 may be configured to send, via transceiver 516, a request message (e.g., location area update request) to a genuine base station in a second location area (e.g., LAI 2). Processor 512 may be configured to receive, via transceiver 516, an accept message (e.g., location area update accept) from the genuine base station. After receiving the accept message, processor 512 may be able to successfully register on the genuine base station and get normal services from the genuine network.

In some implementations, processor 512 may be configured to send, via transceiver 516, a request message (e.g., routing area update request) to network apparatus 520 in a first location area (e.g., location area identity (LAI) 1). Processor 512 may be configured to receiver, via transceiver 516, a non-integrity protected reject message (e.g., routing area update reject) from network apparatus 520. The reject message may comprise a reject cause (e.g., cause #7) to indicate that GPRS services is not allowed. Processor 512 may be configured to determine whether network apparatus 520 is a single domain cell. This may be determined according to the system information broadcasted by network apparatus 520. Processor 512 may be configured to receive system information transmitted from network apparatus 520 and determine whether network apparatus 520 supports solely single domain services. After determining that network apparatus 520 is a single domain cell and receiving the reject message with cause #7, processor 512 may be configured to store an identification of the first location area (e.g., LAI 1) in a forbidden location area list (e.g., a list of "forbidden location areas for roaming"). Then, processor 512 may be configured to perform cell selection or re-selection to search for a suitable cell for registration. Processor 512 may be configured to ignore network apparatus in the first location area (e.g., LAI 1) and searching for another location area or tracking area. Processor 512 may be configured to send, via transceiver 516, a request message (e.g., routing area update request) to a genuine base station in a second location area (e.g., LAI 2). Processor 512 may be configured to receive, via transceiver 516, an accept message (e.g., routing area update accept) from the genuine base station. After receiving the accept message, processor 512 may be able to successfully register on the genuine base station and get normal services from the genuine network.

Illustrative Processes

Figure 6:
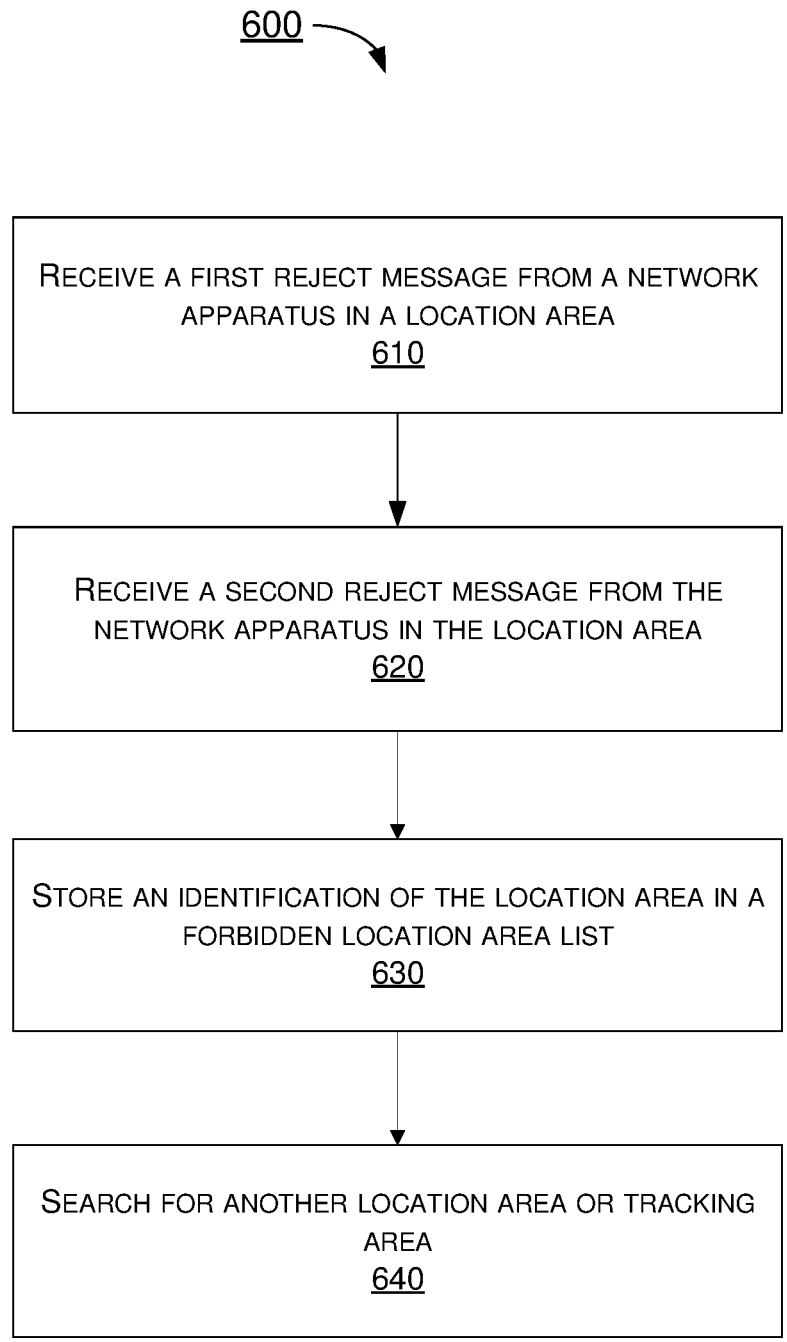
FIG. 6 is a flowchart of an example process in accordance with an implementation of the present disclosure.

FIG. 6 illustrates an example process 600 in accordance with an implementation of the present disclosure. Process 600 may be an example implementation of scenario 200, whether partially or completely, with respect to avoiding denial of services in accordance with the present disclosure. Process 600 may represent an aspect of implementation of features of communication apparatus 510. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 510 or any suitable MS, UE or machine type devices. Solely for illustrative purposes and without limitation, process 600 is described below in the context of communication apparatus 510. Process 600 may begin at block 610.

At 610, process 600 may involve communication apparatus 510 receiving a first reject message from a network apparatus in a location area. Process 600 may proceed from 610 to 620.

At 620, process 600 may involve communication apparatus 510 receiving a second reject message from the network apparatus in the location area. Process 600 may proceed from 620 to 630.

At 630, process 600 may involve communication apparatus 510 storing an identification of the location area in a forbidden location area list. Process 600 may proceed from 630 to 640.

At 640, process 600 may involve communication apparatus 510 searching for another location area or tracking area.

In some implementations, the first reject message may comprise a first reject cause and the second reject message may comprise a second reject cause. At least one of the first reject cause and the second reject cause may indicate that general packet radio service (GPRS) service is not allowed. At least one of the first reject cause and the second reject cause may indicate that international mobile subscriber identity (IMSI) is unknown in a home location register (HLR).

In some implementations, one of the first reject cause and the second reject cause may be a reject cause number 7 and the other one of the first reject cause and the second reject cause may be a reject cause number 2. The network apparatus supports both circuit switch (CS) domain service and packet switch (PS) domain service.

In some implementations, the forbidden location area list may be a list of forbidden location areas for roaming. At least one of the first reject message and the second reject message may be at least one of a routing area update reject message, a location area update reject message and an attach reject message.

In some implementations, process 600 may involve communication apparatus 510 recording that the first reject cause is received from the location area. Process 600 may further involve communication apparatus 510 ignoring network apparatus in the location area when searching for another location area or tracking area.

Figure 7:
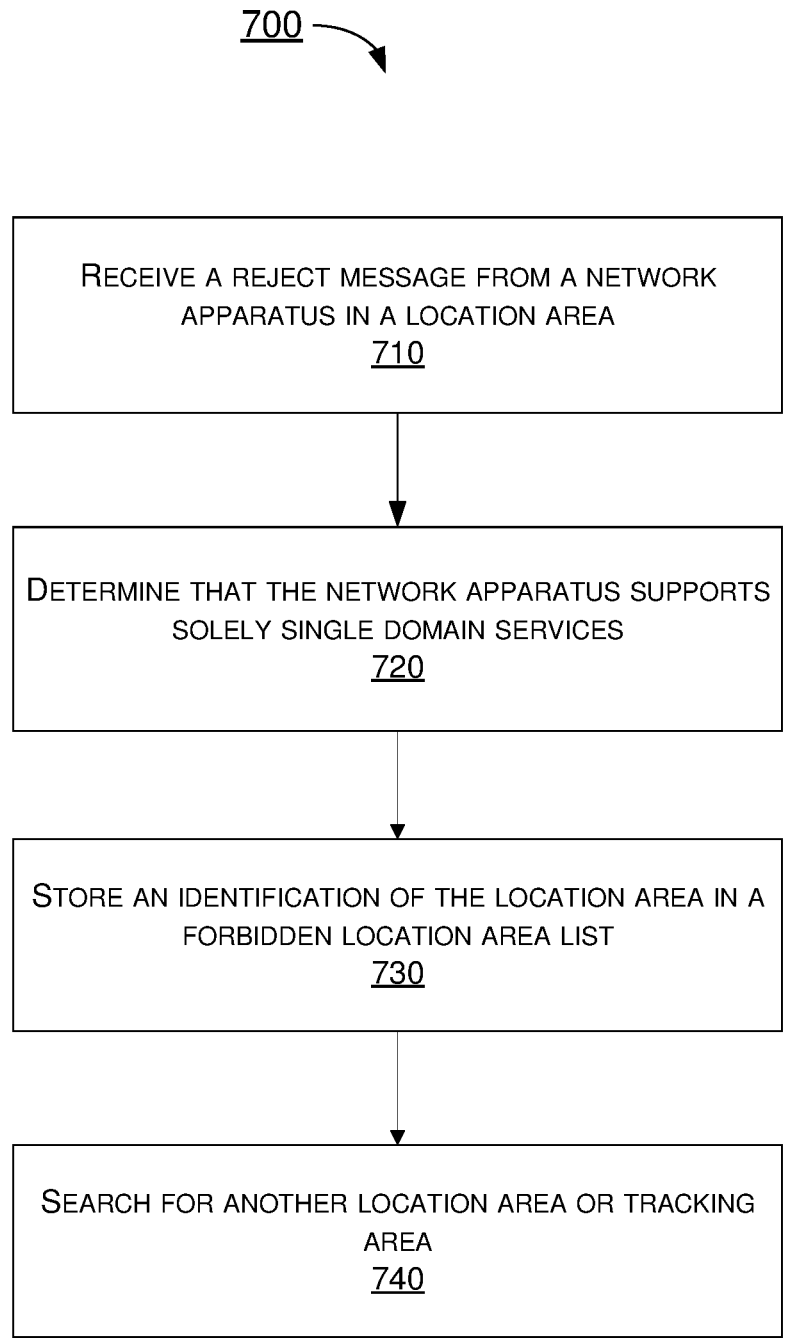
FIG. 7 is a flowchart of an example process in accordance with an implementation of the present disclosure.

FIG. 7 illustrates an example process 700 in accordance with an implementation of the present disclosure. Process 700 may be an example implementation of scenarios 300 and 400, whether partially or completely, with respect to avoiding denial of services in accordance with the present disclosure. Process 700 may represent an aspect of implementation of features of communication apparatus 510. Process 700 may include one or more operations, actions, or functions as illustrated by one or more of blocks 710, 720, 730 and 740. Although illustrated as discrete blocks, various blocks of process 670 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 510 or any suitable MS, UE or machine type devices. Solely for illustrative purposes and without limitation, process 700 is described below in the context of communication apparatus 510. Process 700 may begin at block 710.

At 710, process 700 may involve communication apparatus 510 receiving a reject message from a network apparatus in a location area. Process 700 may proceed from 710 to 720.

At 720, process 700 may involve communication apparatus 510 determining that the network apparatus supports solely single domain service. Process 700 may proceed from 720 to 730.

At 730, process 700 may involve communication apparatus 510 storing an identification of the location area in a forbidden location area list. Process 700 may proceed from 730 to 740.

At 740, process 700 may involve communication apparatus 510 searching for another location area or tracking area.

In some implementations, the reject message may comprise a reject cause. The reject cause may indicate that general packet radio service (GPRS) service is not allowed. Alternatively, the reject cause may indicate that international mobile subscriber identity (IMSI) is unknown in a home location register (HLR).

In some implementations, the reject cause may be a reject cause number 7 or a reject cause number 2. The network apparatus may support solely circuit switch (CS) domain service or packet switch (PS) domain service.

In some implementations, the forbidden location area list may be a list of forbidden location areas for roaming. The reject message may be at least one of a routing area update reject message, a location area update reject message and an attach reject message.

In some implementations, process 700 may involve communication apparatus 510 ignoring network apparatus in the location area when searching for another location area or tracking area.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of an apparatus, a first kind of request and a second kind of request to a network apparatus of a network, wherein the first kind of request and the second kind of request are transmitted separately, and wherein the network is a Network Operation Mode II (NMO-II) network;
   receiving, by the processor, a non-integrity protected first reject message with a first reject cause from one of a circuit switch (CS) domain and a packet switch (PS) domain of the network apparatus in a first location area as a result of transmitting the first kind of request to the network apparatus;
   receiving, by the processor, a non-integrity protected second reject message with a second reject cause different than the first reject cause from the other one of the CS domain and the PS domain of the network apparatus in the first location area as a result of transmitting the second kind of request which is different from the first kind of request and separately transmitted to the network apparatus;
   determining, by the processor responsive to receiving the first and the second reject messages, that an access to the PS domain and the CS domain in the first location area is not allowed;
   storing, by the processor, an identification of the first location area in a list of forbidden location areas for roaming responsive to the first and the second reject messages being respectively received from the CS domain and the PS domain of the network apparatus of the first location area; and
   searching, by the processor, for a second location area or tracking area different from the first location area,
   wherein the storing of the identification of the first location area comprises:
      maintaining a flag to record whether a reject cause in the PS domain or another reject cause in the CS domain is received;
      setting the flag when one of the PS domain and the CS domain is rejected; and
      storing the identification of the first location area responsive to the flag being set and receiving the reject cause from the other one of the CS domain and the PS domain.

2. The method of claim 1, wherein at least one of the first reject cause and the second reject cause indicates that a general packet radio service (GPRS) is not allowed.

3. The method of claim 1, wherein at least one of the first reject cause and the second reject cause indicates that an international mobile subscriber identity (IMSI) is unknown in a home location register (HLR).

4. The method of claim 1, wherein one of the first reject cause and the second reject cause is a reject cause number 7 as defined in a $3^{rd}$ Generation Partnership Project (3GPP) specification, and wherein the other one of the first reject cause and the second reject cause is a reject cause number 2 as defined in the 3GPP specification.

5. The method of claim 1, wherein the network apparatus supports both CS domain services and PS domain services.

6. The method of claim 1, wherein at least one of the first reject message and the second reject message also comprises a location area update reject message.

7. The method of claim 1, further comprising:
recording, by the processor, that the first reject cause is received from the first location area.

8. The method of claim 1, wherein the first reject cause comprises a reject cause in the PS domain, wherein the second reject cause comprises a reject cause in the CS domain, and wherein the storing of the identification of the first location area in the forbidden location area list comprises storing the identification of the first location area in the forbidden location area list upon receiving the reject cause in the PS domain and the reject cause in the CS domain.

9. A method, comprising:
receiving, by a processor of an apparatus, system information broadcasted by a network apparatus in a first location area;
receiving, by the processor, a reject message from the network apparatus;
determining, by the processor and based on the system information, that the network apparatus supports solely single domain services in either a circuit switch (CS) domain or a packet switch (PS) domain; and
in response to receiving the reject message and determining that the network apparatus supports solely the single domain services and that an access to either the CS or the PS domain is denied:
storing, by the processor, an identification of the first location area in a list of forbidden location areas for roaming;
ignoring, by the processor, the network apparatus in the first location area; and
searching, by the processor, for a cell from a second location area or tracking area different from the first location area,
wherein the storing of the identification of the first location area comprises:
maintaining a flag to record whether a reject cause in the PS domain or another reject cause in the CS domain is received;
setting the flag when one of the PS domain and the CS domain is rejected; and
storing the identification of the first location area responsive to the flag being set and receiving the reject cause from the other one of the CS domain and the PS domain.

10. The method of claim 9, wherein the reject message comprises a respective reject cause.

11. The method of claim 10, wherein the reject cause indicates that a general packet radio service (GPRS) is not allowed.

12. The method of claim 10, wherein the reject cause indicates that an international mobile subscriber identity (IMSI) is unknown in a home location register (HLR).

13. The method of claim 10, wherein the reject cause is a reject cause number 7 as defined in a $3^{rd}$ Generation Partnership Project (3GPP) specification or a reject cause number 2 as defined in the 3GPP specification.

14. The method of claim 9, wherein the network apparatus supports solely CS domain services or PS domain services.

* * * * *